No. 850,505. PATENTED APR. 16, 1907.
W. F. TILL & J. C. NEWTON.
CLOSET SEAT.
APPLICATION FILED DEC. 4, 1906.

Witnesses
A. B. Decker
Gertrude Manning

Inventors
William F. Till
John C. Newton
By Delbert H. Decker
Attorney

UNITED STATES PATENT OFFICE.

WILLIAM F. TILL AND JOHN C. NEWTON, OF BROOKLYN, NEW YORK.

CLOSET-SEAT.

No. 850,505. Specification of Letters Patent. Patented April 16, 1907.

Application filed December 4, 1906. Serial No. 346,201.

*To all whom it may concern:*

Be it known that we, WILLIAM F. TILL and JOHN C. NEWTON, citizens of the United States, and residents of Brooklyn, State of New York, have invented a new and useful Improvement in Closet-Seats, of which the following is a specification.

This invention relates to closet-seats, and has for its principal object the construction of a closet-seat in such a manner that the parts forming the same cannot become separated from one another, as is so commonly the case in seats as now usually made.

Another object of the invention is to provide a simple means for effecting this permanent union of the parts of the seat.

With this end in view the invention consists in the structure and combination of parts forming the same, substantially as hereinafter described and claimed.

Figure 1:
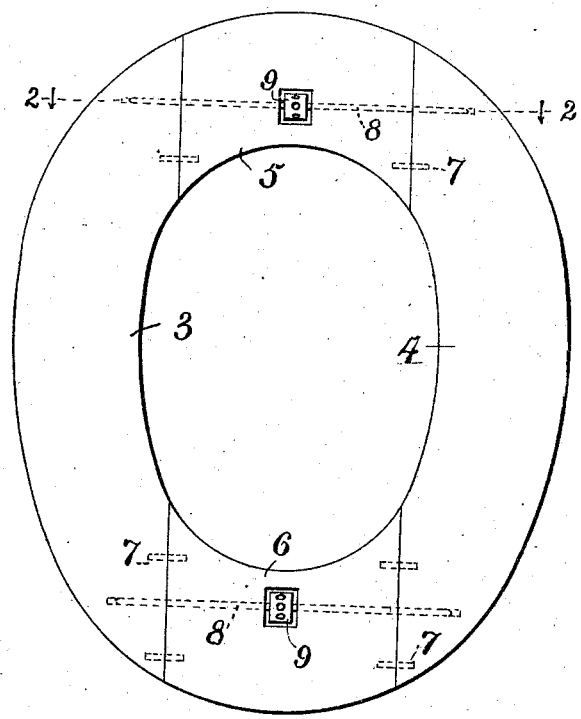
Figure 2:
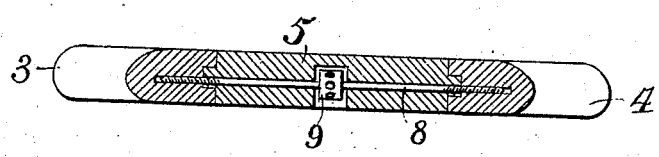
Figure 3:
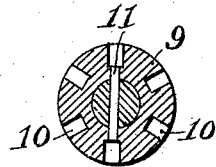

In the accompanying drawings, which form a part of this specification, Figure 1 shows a plan of the under side of a closet-seat embodying the invention. Fig. 2 is a transverse vertical section of the seat, taken in the plane indicated by the line 2 2, Fig. 1; and Fig. 3 shows, on an enlarged scale, a transverse section through the hub of the screw by which the parts of the seat are held together.

The seat is preferably formed of the two side members 3 4 and the two end members 5 6. These may be glued together and provided with two or more dowels at either end of the seat, as indicated at 7, Fig. 1, or they may be united by tongue and groove, as indicated in Fig. 2. To insure the union between these parts, a long double wood-screw 8 is preferably used, the threads on its opposite ends being opposed to one another. On the middle of this screw a turning collar or hub 9 is mounted in any suitable manner. The hub shown consists of a collar provided with holes 10 for the insertion of a nail-set or other implement, as a turning lever, which collar may be secured to the screw by means of a pin 11, as seen in Fig. 3. A screw of the sort just described is located in each end of the seat.

The parts of the seat are assembled by passing the screw 8 transversely through holes in the end pieces 5 6 and through the collars 9 first dropped into the recesses provided therefor in said end pieces. When this screw has been thus inserted, the pin 11 is put in place. Then the said pieces 3 4 of the seat are brought up to the screws and the screws turned into the same until the side pieces are drawn snugly against the end pieces. A little play being provided in the recesses into which said hubs are located will allow the bringing up of both side pieces into equally snug engagement with the end pieces.

The invention claimed is—

1. In a closet-seat, the combination with side pieces of integral end pieces having holes extending through them and recesses formed in the under side of the end pieces and communicating with said holes, and double-ended right and left hand wood-screws located in the holes in the end pieces and extending into the side pieces and a removable turning hub upon the middle of each of said screws located in the recess in its respective end piece.

2. A closet-seat consisting of side pieces, intermediate end pieces provided with recesses in their under sides and with holes extending laterally through the end pieces and the recesses, a double-ended right and left hand wood-screw located in the hole of each end piece and having a removable turning hub upon its middle and within the respective recess, said hub being provided with holes for a turning lever and having a pin passing from the bottom of one hole through the hub and screw for the purpose set forth.

In testimony whereof we have signed our names to this specification in the presence of two subscribing witnesses.

WM. F. TILL.
JOHN C. NEWTON.

Witnesses:
W. H. J. GOLDEY,
C. W. HIBBARD.